United States Patent [19]

Vo-Dinh

[11] Patent Number: 5,325,342
[45] Date of Patent: Jun. 28, 1994

[54] SURFACE-ENHANCED RAMAN OPTICAL DATA STORAGE SYSTEM

[75] Inventor: Tuan Vo-Dinh, Knoxville, Tenn.

[73] Assignee: Martin Marietta Energy Systems, Inc., Oak Ridge, Tenn.

[21] Appl. No.: 865,302

[22] Filed: Apr. 8, 1992

[51] Int. Cl.$^5$ .............................................. G11B 13/04
[52] U.S. Cl. ....................................... 369/13; 365/124
[58] Field of Search ................ 365/124, 119, 120, 126, 365/125, 122, 118, 109; 369/13, 126; 356/301

[56] References Cited

U.S. PATENT DOCUMENTS

| | | | |
|---|---|---|---|
| 4,032,901 | 6/1988 | Levinthal | 340/173 |
| 4,101,976 | 7/1978 | Castro et al. | 365/119 |
| 4,333,165 | 6/1982 | Swainson et al. | 365/120 |
| 4,434,477 | 2/1984 | Sander et al. | 365/120 |
| 4,674,878 | 6/1987 | Vo-Dinh | 356/301 |
| 4,802,760 | 2/1989 | Inoue et al. | 356/31 |
| 4,807,218 | 2/1989 | Gerber | 365/126 |
| 4,807,991 | 2/1989 | Carew | 356/72 |
| 4,812,036 | 3/1989 | Inoue | 356/32 |
| 4,832,483 | 5/1989 | Verma | 356/39 |
| 4,864,536 | 9/1989 | Lindmayer | 365/119 |
| 4,999,810 | 3/1991 | Vo-Dinh | 365/124 |

OTHER PUBLICATIONS

"Micro Chips" by T. A. Heppenheimer, *Popular Science*, Dec. 1986, pp. 64–69.

Bell, A. E., Recent Developments in Optical Storage Technology, *Nature*, vol. 297, May 13, 1982, pp. 104–106.

Bell, A. E., Optical Discs for Information Storage, *Nature*, vol. 287, Oct. 16, 1980, pp. 583–585.

*Primary Examiner*—Robert J. Pascal
*Assistant Examiner*—Tan Dinh
*Attorney, Agent, or Firm*—Luedeka, Hodges, Neely & Graham

[57] ABSTRACT

An improved Surface-Enhanced Raman Optical Data Storage System (SERODS) is disclosed. In the improved system, entities capable of existing in multiple reversible states are present on the storage device. Such entities result in changed Surface-Enhanced Raman Scattering (SERS) when localized state changes are effected in less than all of the entities. Therefore, by changing the state of entities in localized regions of a storage device, the SERS emissions in such regions will be changed. When a write-on device is controlled by a data signal, such a localized regions of changed SERS emissions will correspond to the data written on the device. The data may be read by illuminating the surface of the storage device with electromagnetic radiation of an appropriate frequency and detecting the corresponding SERS emissions. Data may be deleted by reversing the state changes of entities in regions where the data was initially written. In application, entities may be individual molecules which allows for the writing of data at the molecular level. A read/write/delete head utilizing near-field quantum techniques can provide for a write/read/delete device capable of effecting state changes in individual molecules, thus providing for the effective storage of data at the molecular level.

20 Claims, 5 Drawing Sheets

SURFACE-ENHANCED RAMAN OPTICAL DATA STORAGE SYSTEM

The U.S. Government has rights in this invention pursuant to Contract No. DE-AC05-840R215400 with Martin Marietta Energy Systems, Inc., awarded by the U.S. Department of Energy and funded through OTA Maturation Funds.

FIELD OF THE INVENTION

The present invention relates to optical data storage and, in particular, an improved optical data storage system based on the phenomenon of Surface-Enhanced Raman Scattering (SERS).

BACKGROUND OF THE INVENTION

For the last three (3) decades, magnetic data storage has remained the cornerstone for machine-readable data storage. In the 1970's, research efforts were devoted to investigate new generations of data storage devices based on nonmagnetic principles, such as optical data storage systems. Whereas magnetic data storage disks provide excellent access time and erasability, optical data storage systems can provide a unique combination of superior performance features that make them most appropriate for large memory applications. Optical data storage disks promise to offer low cost-per-bite, improved accessing characteristics and higher storage efficiency. Several optical data storage techniques have been developed which have increased the possible data storage density of a storage device by several orders of magnitude. However, the majority of these types of optical storage systems are non-erasable or Write Once Read Many (WORM) systems. While such WORM systems are useful for library or archive applications, the fact that they are not erasable limits their usefulness.

One such WORM system was disclosed in U.S. Pat. No. 4,999,810, entitled Surface-Enhanced Raman Optical Data Storage System by the present inventor which is incorporated by reference herein. While the Surface-Enhanced Raman Scattering (SERS) phenomenon provides for high density optical data storage, it suffers from the same limitations as do other WORM systems.

The SERS phenomenon is based upon the interaction between a SERS-active support layer and a SERS-active optical layer. Research has taught that emission of radiation based on the SERS effect is highly dependent upon the interaction between the optical layer and the support layer or medium and that minute changes in either layer result in markedly changed SERS emissions. In fact, provided the equipment has sufficient resolution, changes in SERS emissions can result from changes in either the optical layer or support layer at the molecular level. It is this fact that provides a Surface-Enhanced Raman Optical Data Storage (SERODS) system with extremely high data storage density capacity.

It is an object of this invention to provide an improved SERODS system for high density optical data storage based upon the SERS effect. It is an additional object of this invention to provide a SERS based system that is erasable. It is a further object of this invention to provide an optical system that, when used with an appropriate high density SERS storage device, is capable of reading and/or writing data at or near the molecular level.

SUMMARY OF THE INVENTION

The present invention provides an apparatus for an improved Surface-Enhanced Raman Optical Data Storage System (SERODS). The basic storage device is of a type which will emit SERS when excited. One feature of this improved SERODS device is that the storage device is capable of multiple states of SERS emission which are substantially reversible. The initial storage device is configured so that the SERS emissions over the entire surface or medium of the storage device are uniform. This corresponds to a bland or reference state. During a write-on procedure various portions of the storage device are disturbed so that these portions of the storage device are placed into an alternate SERS emission state.

The write-on device, controlled by a data signal, selectively disturbs portions of the storage device and places them in a second or written state to, thereby, store data. This written state is characterized by increased SERS emissions or decreased SERS emissions or may be a combination of a change in the intensity and/or a frequency shift. In order to read the stored data, an excitation device, which emits electromagnetic radiation of an appropriate frequency, selectively illuminates portions of the surface of the storage device and causes SERS emissions. The portions of the storage device which contain written data will produce SERS emissions that are different from the blank portions of the storage device and therefore a change in the SERS intensity or frequency can be detected as one scans across the storage device. A detector or sensor probe is moved across the storage device (or the storage device may be moved relative to the detector) to observe the SERS emissions and generate a signal corresponding to changing SERS emissions, which in turn correspond to the data previously written on the surface of the storage device.

In the multi-state SERODS system described, a delete system may be utilized, if so desired, to return the portions of the storage device from a written state to the blank or reference state. The delete device is normally of the same type as the write-on device but has, for example, an opposite polarity or changed intensity.

In the preferred embodiment, the storage means is made of a support means and a SERS active support layer disposed on the support means. A SERS-emitting optical layer is disposed on the SERS-active support layer. The preferred SERS-emitting optical layer is an organic or inorganic chemical which is capable of existing in two or more separate states. The states of the SERS-emitting optical layer are such that they may be independently selected in an entity, such as a particle, molecule or atom or groups of entities, of the optical layer and will exhibit changed SERS emissions depending upon the state of the particle or group of particles.

The preferred SERS-active support layer is made of two layers, a SERS-active substrate, which is disposed evenly over the surface of the support means, and a metal layer disposed evenly over the substrate. The preferred write-on means is a laser of sufficiently high intensity to cause state changes in the particle or particles of the SERS-emitting optical layer. Other possible write-on means will be dictated as a result of the type of states present in the particle or particles of the SERS-emitting optical layer. For example, the write-on means may be of the type used to generate chemical polarity differences, electric field differences, magnetic field differences, or other changes in the environment surrounding the particle or particles wherein a state change is desired.

Three embodiments described below illustrate the types of state changes and chemicals that may be used in a multi-state SERODS system. A first embodiment utilizes changes in adsorption states wherein the adsorption relationship between an entity or group of entities in the optical layer may be varied with the respect to the SERS-active support layer. A second embodiment utilizes directionally oriented entities or groups of entities within the optical layer to effect directional state changes in the optical layer with respect to the SERS-active support layer. In a third embodiment, the multiple states represent molecular states of the molecules of the optical layer and may be such states such as the electronic, vibrational, rotational, or charge transfer states of the molecules of the optical layer.

In a preferred embodiment, wherein the multiple state changes are states that exist at the molecular level, a write and read means capable of focusing at the molecular level is desirable. In this embodiment, a near field microhead is a part of a read/write/delete means that uses near field techniques to provide "light beams" that are smaller in diameter and length than the wavelength of light utilized to generate the beam. The microhead includes a light propagation means, such as an optical fiber and a light source injecting light into the propagation means. The end of the propagation means is a small aperture corresponding in size to the portion of the optical layer which is to be written; i.e., if the writing is intended to occur on individual molecules in the optical layer then the aperture must be on the order of the size of those molecules. The aperture must be scanned very close to the surface of the storage device in what is called the "near field" region, a region less than a wavelength away from the surface of a storage device. When the aperture is in the near field region of the storage device, light will be collimated to the diameter of the aperture and transmitted to the surface of the storage device. In this construction, the microhead writes data on the portion of the storage device which is the size of the aperture.

The near field microhead may also read and delete data at the molecular level, and transmit light to the storage device to cause SERS emissions. As such, this preferred embodiment provides for writing, reading and deletion of data at the molecular level while the SERS phenomena provides for sensitivity necessary to detect molecular changes so as to allow data to be stored and retrieved at the molecular level.

To keep the aperture within the near field region, some type of control system must be utilized. In the preferred embodiment an atomic force feedback system, which measures the atomic force between the aperture tip and the surface of the storage device is utilized to control the distance of the tip from the surface of the storage device. In additional embodiments, the preferred control system may by either an electron or photon scanning/tunneling feedback control system or an ion conductance feedback control system.

The apparatus of the present invention presents many advantages over the prior art in the field of optical data storage. The multiple state characteristics of the present SERODS system provide for erasable data storage should that be desired, and it also provides for a practical method for the storage and retrieval of data at the molecular level.

Since the SERS phenomena is frequency dependant, security is enhanced by using a write and read means of a frequency known only to the operator. Additionally, write and read means of various frequencies could be used on the same storage device to provide for a variety of storage and access frequencies.

The resolution of the SERS phenomenon arises because of the fact that the SERS phenomenon acts essentially as an amplifier of change. For example, small molecular state changes in the molecules of the optical layer are not normally easily detected; however, such small changes become very apparent in the context of the SERS phenomena. Therefore molecular state changes become a practical basis for the storage of data.

The present SERODS system is also capable of three dimensional data storage by layering the previously described storage devices or providing a three dimensional matrix of spherical storage devices in a polymer material or any suitable optically transparent material amenable to SERS detection. Data may be stored in such a three-dimensional storage device by focusing the write beam to a desired depth, or alternatively, holographic techniques may be utilized to achieve greater storage density in a three-dimensioned storage device.

BRIEF DESCRIPTION OF THE DRAWINGS

The present invention may be best understood by reference to the following Detailed Description of exemplary embodiments when considered in conjunction with the drawings in which.

DETAILED DESCRIPTION OF THE PREFERRED EMBODIMENT

Figure 1:
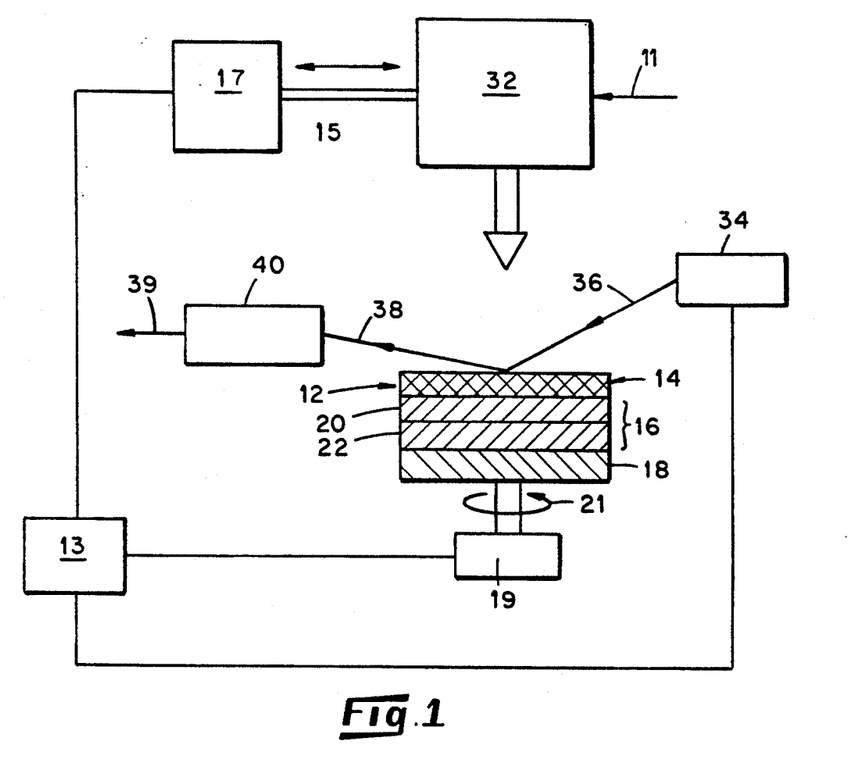
FIG. 1 is a schematic cross sectional view of a storage device showing its multilayer structure and a preferred read/write/delete system.

Referring now to the drawings in which like reference characters designate like or corresponding features throughout the figures, there is shown in FIG. 1 a SERS storage device 12 shown in cross-section and comprising three individual layers; a disk support 18, a SERS-active support layer 16, and an optical layer 14. The optical layer 14 is an organic or inorganic chemical which, when disposed near or adjacent to a SERS-active support layer 16, will emit SERS when excited; this SERS emission is highly dependent upon the interaction between the SERS-active support layer 16 and the molecules of the optical layer 14. If either the morphology of the SERS-active support layer 16, or the states of the molecules of the optical layer 14 are changed, the emission of SERS by the optical layer 14, when excited, will be substantially altered. A basic SERS storage device may be constructed by providing a support medium 18 such as a plastic disk (alternative support mechanisms, such as a continuous moving tape, may also be prepared in accordance with the disclosed invention). A SERS-active support layer 16 may then be placed on the surface of the supporting medium 18.

Preferably, the SERS-active support layer 16 includes a substrate 22 evenly distributed on the support medium 18. To produce the substrate 22, microbodies such as polystyrene, titania, alumina or fumed silica spheres or microparticles are placed into suspension in a solution, and about one hundred (100) microliters ($\mu$l) of the solution are placed on the disk support 18. The disk 18 is then spun at about 800 RPM for 100 seconds to evenly distribute the spheres over the surface of the disk support 18. Once the substrate 22 has been applied, a suitable metal layer 20 is applied to complete the SERS-active support layer 16. For example, after allowing substrate 22 to dry, the disk support 18 is placed inside a vacuum chamber and, by thermal evaporation, a metal layer 20, such as aluminum, silver, gold or other metals, is deposited on the substrate 22.

Upon completion of the preparation of the SERS-active support layer 16 on the support 18, the optical layer 14 is provided. The exact composition of the optical layer 14 will be dependent upon several factors and will be more fully discussed hereinafter.

Additionally, FIG. 1 shows a complete preferred system for utilizing the erasable SERODS storage medium 12. In the preferred system, the storage device 12 is provided on a shaft 21 which is in turn connected to rotating device 19. This allows a disk shaped storage device 12 to be moved so that the read and write procedures may take place. For the purposes of writing data onto the storage device 12, a data signal 11 is input into the write device 32. The write device 32 in turn produces a write beam 28 which effects localized state changes either in the optical layer 14 of the storage device 12 or changes in the support layer 16. A read/write control device 13 sends control signals to a write device scanner 17, disk turntable 19, and read beam device 34. The control signals generated by read/write control device 13 provide for the proper positioning of the write beam 28 by translation of the write device 32 and of the storage device 12 by turntable 19. The position of the read beam 36, is controlled by read/write control device 13 by controlling direction of the read beam 36 by the read beam device 34 and position of the storage device 12 by turntable 19.

After the data has been written on the storage device 12 by the write device 32 and write beam 28, the written data may be retrieved by scanning the surface of the storage device 12 with a read beam 36 of appropriate wavelength. The read beam 36 is generated by a read beam generator 34 which preferably is a light source of appropriate frequency. The read beam 36 is aimed by read/write controller 13 and read beam device 34 as by a movable mirror, so that the location of the data being read is known. As the read beam 36 strikes the surface of the storage device 12, the SERS emissions generated by that surface 38 will vary according to whether data has been written onto that portion of the storage device 12 which is being scanned by the read beam 36. A SERS emission detector 40 detects the SERS emissions 38 and generates a data signal 39 which corresponds to the changes in SERS emissions detected by the detector 40. The data signal 39 thereby substantially corresponds to the data which has been written on the device by write beam 28.

The write beam 28 may also be used to reverse the state changes originally caused in the optical layer 14 of the storage device 12 as by having a changed intensity or reversed polarity (either light or electric or magnetic fields). As a result, the data written on the storage device may be erased or rewritten.

It is possible to make a SERODS system erasable by selecting an optical layer 14 which is comprised of entities that are capable of existing in two (2) or more independent states. In this type of system, the emission of SERS by the optical layer is dependent upon the state of the individual entities which comprise the optical layer. By producing localized changes of state in the entities comprising the optical layer, it is possible to store data in this type of optical layer.

Figure 2A:
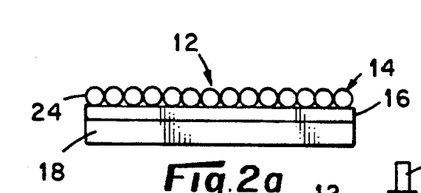
FIGS. 2a, 2b and 2c, are schematic cross sectional view of a storage device showing the multi-state features of a preferred embodiment of the storage device.
Figure 2B:
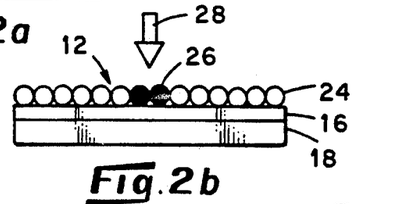
Figure 2C:
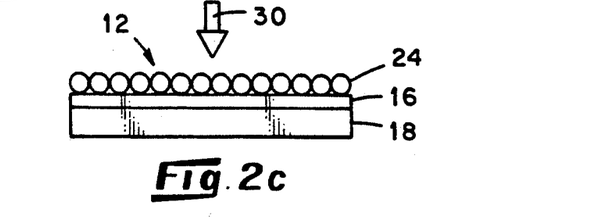

FIGS. 2a, 2b and 2c demonstrate this variable state concept. In FIG. 2a, the optical layer 14 is comprised of a plurality of individual entities 24. The SERS storage medium is, in FIG. 2a, in a reference state; that is, no data has been recorded on the storage device 12. As indicated in FIG. 2a, all of the individual particles or molecules 24 are in substantially the same the state which is indicated by the white circles.

In a write-on procedure, data are written onto the storage medium 12 by selectively altering the state of one or more of the entitles in a local region contained in the optical layer. Referring now to FIG. 2b, a data bit is represented by particles 26 which are in a different state from the remaining blank portions 24 of the medium 12. When the data is to be read, the surface of the storage medium 12 is illuminated with electromagnetic energy of a frequency appropriate to result in the emission SERS by the optical layer as was previously described with reference to FIG. 1. During the reading procedure, the areas where the state of the particles has been altered will exhibit a changed SERS emission which in turn represents a bit of data. Depending upon the composition of the optical layer, the changed SERS emission will be either a frequency shift of the SERS or a change in the intensity of the emitted SERS.

Deletion of a particular data bit is accomplished by once again altering the state of the molecules or particles so that they return to their original or reference state. As shown in FIG. 2c, upon deletion, the molecules or particles 24 contained in the optical layer 14 (shown in FIG. 2a) are once again in the reference state. The read/write/delete process is accomplished using a system as previously described with respect to FIG. 1.

Figure 5A:
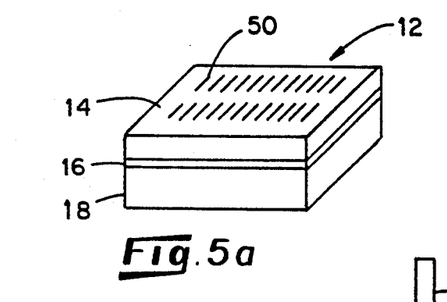
FIGS. 5a, 5b and 5c, are schematic perspective views showing a storage device utilizing multiple directional states.
Figure 5B:
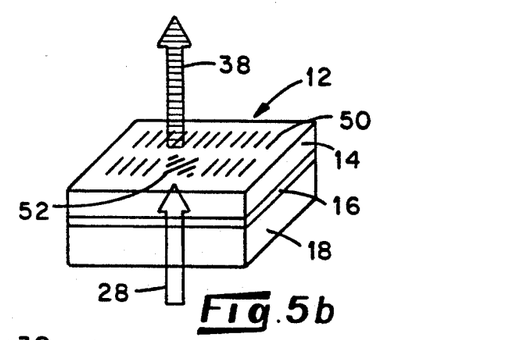
Figure 5C:
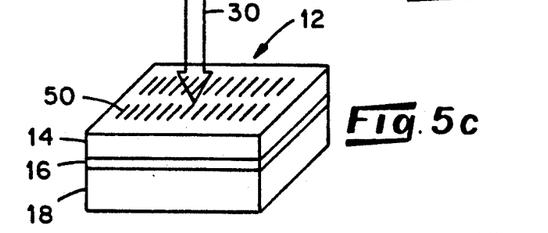
Figure 6A:
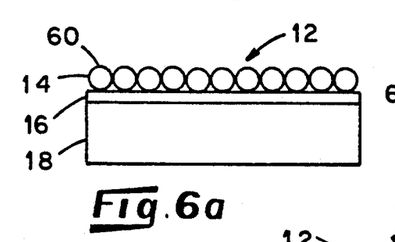
FIGS. 6a, 6b and 6c, are schematic cross sectional views showing a storage device utilizing multiple molecular states.
Figure 6B:
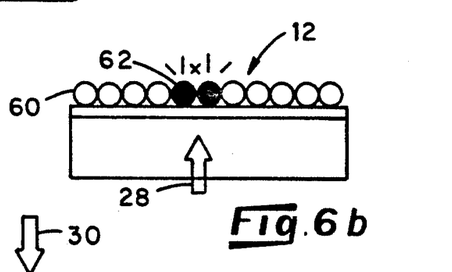
Figure 6C:
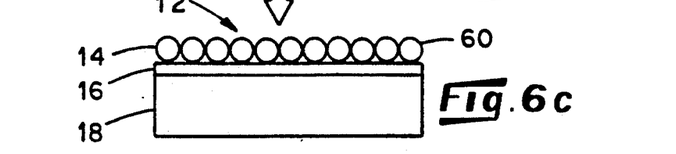

The multi-state characteristic of entities within an optical layer 14 may be accomplished in a variety of ways; however, there are three preferred ways to provide for a multi-state optical layer. For the sake of clarity, the read/write/delete system of FIG. 1 will not be shown; however, the examples shown if FIGS. 3, 5, and 6 are merely alternate embodiments of the storage device 12 as depicted in FIG. 1.

Figure 3A:
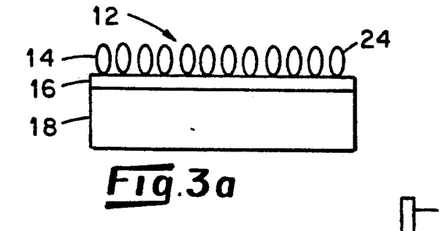
FIGS. 3a, 3b and 3c, are schematic cross sectional views of the storage device showing a multiple adsorption state configuration.
Figure 3B:
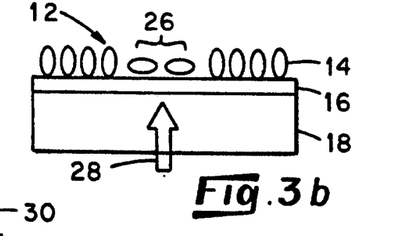
Figure 3C:
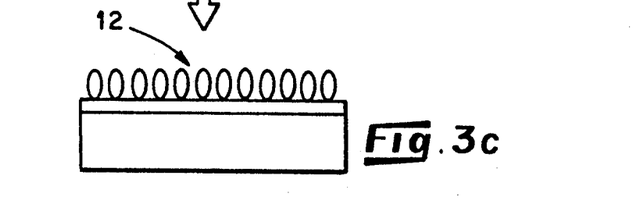

The first of these embodiments is shown in FIGS. 3a, 3b and 3c. In this example, the optical layer 14 consists of entities which have multiple adsorption states with respect to the SERS active support layer 16. In this embodiment, the adsorption state of the molecules or entities of the optical layer 14 is determined by the nature of the microenvironment surrounding the optical layer. For example, if the microenvironment is uniform, the entities of the optical layer 14 will have a substantially uniform adsorption state 24. In order to write data, a write beam 28 is used to vary the microenvironment around a particular entity or group of entities. Changes in the microenvironment could be caused by thermal heating as by the read/delete beam 28 and 30 of FIGS. 1 and 2 being light or could be a change in electromagnetic field as by the read/delete beam 28 and 30 being an electric or magnetic field generated by the write device 32. The alteration of the microenvironment results in a change in adsorption state by the intended entity or entities 26. During a read procedure the optical layer 14 would be illuminated by electromagnetic radiation of an appropriate frequency and the areas of changed adsorption state would be characterized by changed SERS emission as was previously described with reference to FIG. 2.

Deletion of data stored as just described would be accomplished by utilizing a delete beam 30 to change the altered portion of the microenvironment back to its original condition and thus return the affected entity or entities to their original adsorption state 24. The delete beam 30 would be of the same nature as the write beam 28 but would differ in intensity or frequency if a light beam or would have a reversed polarity if an electric or magnetic field.

Alternate write/delete beams may be utilized to select the adsorption state of the particles; for example, molecular beams, electron beams, exciton beams, mechanical devices, thermal beams, or application of chemical compounds may all be utilized to affect the adsorption state of particles disposed on surface by causing localized changes in the microenvironment.

Figure 4:
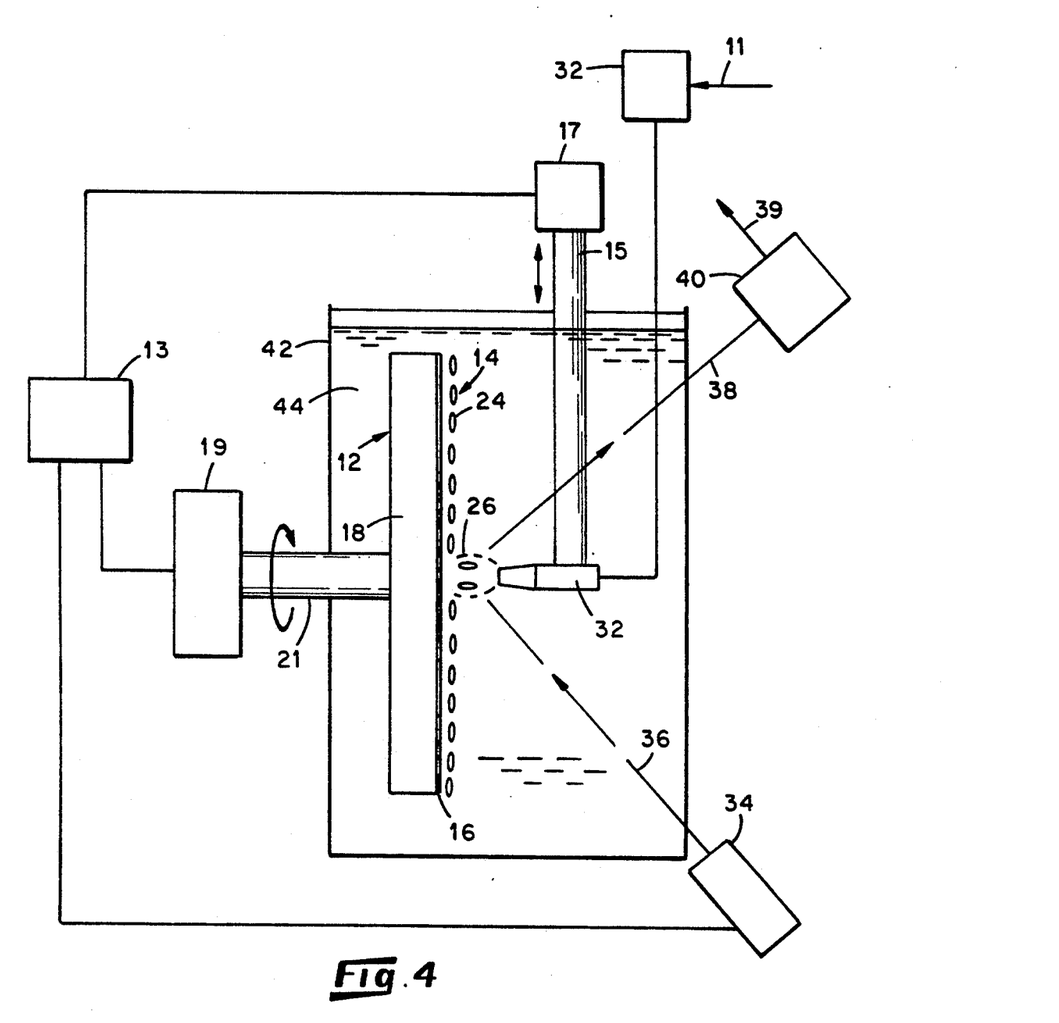
FIG. 4 is a schematic diagram showing a multiple adsorption state configuration of the storage device utilizing an electrolytic cell.

Referring now to FIG. 4, a type of SERS storage device based upon a multiple adsorption state optical layer is depicted. A disk 18 and SERS-active support layer 16 as previously described is provided. The storage device 12 is provided as an electrode in an electrolytic cell 42. The particles which are to make up the optical layer 14 are provided as ions in the electrolyte solution 44.

To obtain a strong SERS emitter, the cell 42 and the electrode/storage device 12 must first be cycled through an oxidation/reduction cycle or activation cycle. In this embodiment, the SERS-active storage device 12 is prepared as previously discussed; however the metal layer 20 deposited on the substrate 22 (see FIG. 1) is silver (or other suitable metal).

A potential is applied to the electrodes of the cell 42 so that silver at the electrode/storage device 12 is oxidized according to the equation:

$$A_g \rightarrow A_g^+ + e^- \qquad (1).$$

The polarity of the electrodes is then reversed and a potential is once again applied to the cell 42 so that silver molecules 24 are plated onto the electrode/storage device 12 according to the reaction:

$$A_g^+ + e^- \rightarrow A_g \qquad (2).$$

Upon completion of the activation cycle, the SERS-active support layer 16 is formed of silver particles 24 plated onto the electrode. It should be noted that the silver particles 24 have a uniform adsorption state following the activation cycle. This activation cycle roughens the surface of metal electrodes and produces a SERS-active support. Following the activation cycle the electrode may be removed from the cell and the optical layer can be coated over the SERS-active support. The disk may then be reinserted into the cell. Alternatively, a SERS-active storage device could be prepared by coating the disk support with submicron particles and then coating the particles with silver and placing the optical layer over the silver coating as was previously described. This device could then be placed in the electrolytic cell without resort to an activation cycle.

An appropriate write means 32, such as an electric or magnetic head, is provided to effect localized electric field or magnetic field changes at the surface of the SERS-active substrate 16 in order to change the adsorption state of the particles 26 on the portion of the medium 12 where data is to stored. Thereafter a read beam 36 of an appropriate electromagnetic frequency is generated by a read beam device 34, such as a laser, and used to illuminate the optical layer 14. Regions having a changed adsorption state 26 will demonstrate a changed SERS emission relative to the unchanged portions 24. The emitted SERS emission 38 is observed by an appropriate detector 40 and a signal corresponding to the data stored on the storage device 12 is generated. An appropriate detector would, for example, be a photomultiplier tube which generates a signal corresponding to the detected radiation. This signal may then be analyzed in a variety of ways known in the art such a utilizing a single channel analyzer, a multi-channel analyzer, or multiplex techniques such as the Fourier Transform method or the Hadamard method may be used to enhance sensor sensitivity.

To record data, an input data signal, preferably a digital signal, is applied to control write means 32 while the storage means 12 and write means 32 are moved, one relative to the other, to produce a scan across the storage means. To read data, a similar scan is effected between the storage means 12 and the excitation energy 36 and detector 40.

In addition to multiple adsorption state configurations, a multiple state optical layer can be produced based on the directional configuration of the individual particles or molecules which make up an optical layer. Referring now to FIGS. 5a, 5b and 5c an optical layer with multiple directional states is shown. As in the prior examples, the basic construction of the storage device 12 consists of a support 18, a SERS-active substrate 16, and an optical layer 14. The disk support 18 and the SERS-active substrate 16 are configured in substantially the same manner as previously described. However the optical layer is obtained by producing a molecular film having a specific directional arrangement on the SERS-active substrate 16.

There are several ways to create organized molecular monolayers; a preferred method is polarized or stretched molecular films to achieve a directionally aligned ionic compound. However, self-assembly systems through adsorption from solution, Langmuir-Blodgett systems, molecules trapped in polymer matrices are all known methods to create such molecular monolayers and may be substituted for the preferred method. Such techniques may be used to create an optical layer 14 on the SERS-active substrate 16 so that the individual molecules or particles within the optical layer have a substantially uniform directional configuration 50 which corresponds to a blank state.

In a preferred embodiment, a directionally aligned compound is used as the optical layer 14 and an appropriate write beam 28, such as a laser or an applied electric or magnetic field generated as was described with reference to FIG. 1 is used to change the directional arrangement of the particles 50 to a new directional state 52 in the writing process. The new molecular orientation 52 results in a change in the intensity or frequency of the SERS emission when polarized or non-polarized excitation and detection modes are utilized. During a read procedure, the optical layer 14 is excited utilizing read beam 30 of an appropriate frequency generated as was described with reference to FIG. 1; a particularly preferred read beam device 34 (of FIG. 1) would be a laser operated in a polarized mode or the exit optics of the read beam device could include a polarized filter. The areas of non-uniform directional orientation will exhibit a changed SERS emission 38 corresponding to the data contained on the disk which is detected and a data signal generated as was previously described. In a delete process, a delete beam 30 (such as a laser or an electric or magnetic field) is used to re-orient the particles 52 of the optical layer 14 so that they are returned to their original state 50.

The ability to orient isolated molecules in polymer films provides a type of optical layer for multiple directional state data storage. Experience shows that appropriate polymers utilized to orient isolated molecules in a thin film optical layer 14 do not prevent the detection of SERS emissions even though the SERS-active substrate 16 is covered by such a polymer layer.

Another way to impart multiple state changes into an optical layer is shown in FIGS. 6a, 6b, and 6c. As in the previous examples the disk support 18 and the SERS-active substrate 16 are formed as previously described. In this particular example, however, the optical layer 14 is made up of individual molecules which have multiple molecular states. There are a wide variety of molecular compounds that have reversible changes in the electronic, vibrational, rotational, or charge transfer states of molecules. These reversible changes have been detected in the past by various techniques such as reflection, UV/IR absorption, or luminescence or raman spectroscopies; however utilizing these molecular state changes in combination with a SERS-active substrate provides an improved means for detecting state changes due to the spectral selectivity and detection sensitivity of the SERS phenomenon.

In a system based on reversible molecular state changes, the optical layer 14 in the blank state would consist of particles having a uniform molecular state 60. In a write procedure, a write beam 28 of an appropriate type based upon the nature of the molecular state is utilized to impart a changed molecular state on molecules or groups of molecules 62 where data are to be written. Such molecules 62 would then be in a different state from the other molecules 60 and when illuminated with appropriate radiation would exhibit changed SERS emission. In a delete procedure an appropriate delete beam 30 would be used to reverse the molecular state change to the original or blank molecular state so that the particles once again return to a uniform molecular state 60.

Several types of molecular systems may be used. A preferred system utilizes reversible molecular systems used in luminescence, infrared Raman, reflection, and absorption (color) changes. For example, molecules such as inorganic or organic chemicals that have reversible molecular states or photochrome pigments that are used in conventional erasable optical storage systems are preferred; such chemicals include phthalocyanine pigments, cyanine-based pigments, amino compounds, nitro compounds, quinone systems, and benzthiopyrane, etc. Under laser radiation (the write procedure), these systems undergo reversible molecular state changes and such changes would show up as a change in their SERS frequencies and/or SERS signal intensities when illuminated with an appropriate read beam 36 as previously described. Also, new types of chemicals exhibiting reversible molecular-state changes involving electronic, vibrational, rotational, and charge-transfer processes which have been developed can be adapted for use in this embodiment as a substitute for the preferred optical layer 16.

Figures 7, 8:
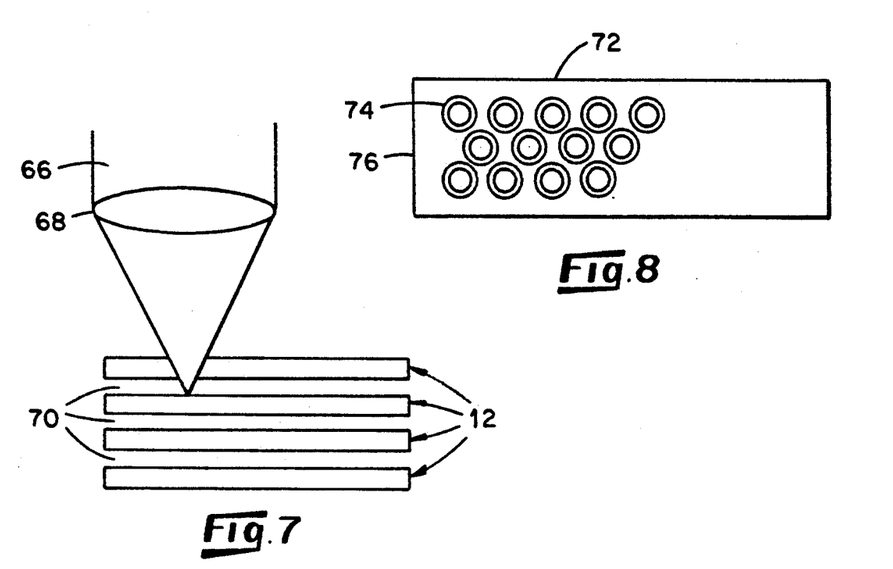
FIG. 7 is a schematic cross sectional view showing a three-dimensional storage device consisting of layered storage devices.
FIG. 8 is a schematic cross sectional view showing a three-dimensional storage device consisting of SERS-active spheres imbedded in a polymer matrix.

While the previously described SERS storage devices have essentially been two-dimensional storage devices, storage devices utilizing the SERS phenomena can be constructed to store data in three dimensions. An example of such a system is shown in FIG. 7. The simplest version of this type of three dimension data storage would be to simply to layer SERS active storage devices 12 and separate them by transparent layers 70. Any one of the previously described multiple state SERS storage devices could be utilized in this operation. In operation, a combined read/write beam 66 would be focused by optics 68 onto a preselected SERS-active storage layer 12. In this manner data storage density could be greatly enhanced.

FIG. 8 shows another configuration of a SERS storage device 72 capable of three dimensional data storage. The operational characteristics are similar to that of previously described three dimensional configuration, but the construction is different. In this embodiment, SERS-active microbodies 74 are embedded in a three-dimensional fashion in a suitable matrix medium 76 such as epoxy resin, polyacrylamide or the like. The microbodies 74 can be comprised of a substrate particle coated with an optical species which exhibits multiple state characteristics in effect creating a plurality of microparticle storage devices which function as was described with respect to the two dimensional storage device 12 as was previously described.

With the ability to store data in three dimensions, it is possible to utilize holographic optical techniques to increase the data storage density in such a storage device. Thus the use of holographic write and read modes will enhance the data density in a three-dimensional SERS-active storage medium as previously described.

As will now be apparent from the previous discussion it is possible to have multiple state molecules, each of which is capable of storing one bit of data. Utilization of the SERS phenomena makes such individual molecular state changes detectable provided the resolution of the writing, reading and deletion equipment is sufficient. However, until recently, the smallest dimension of resolution possible was on the order of the wavelength of light used in a read or write beam. However, resolution was rarely on the order of the wavelength of the light used because the required optics, in most cases, tended to degrade the resolution.

However, with the advent of near field techniques, light beams smaller than their wavelength can be produced. In the near field technique, the light is made to pass through an aperture that is much smaller than the wavelength of the incident radiation. The aperture is scanned very close to the surface of the storage device (less than a wavelength away) in a region called the "near field". The light is collimated to the diameter to the aperture itself and does not have a chance to diverge.

Figure 9:
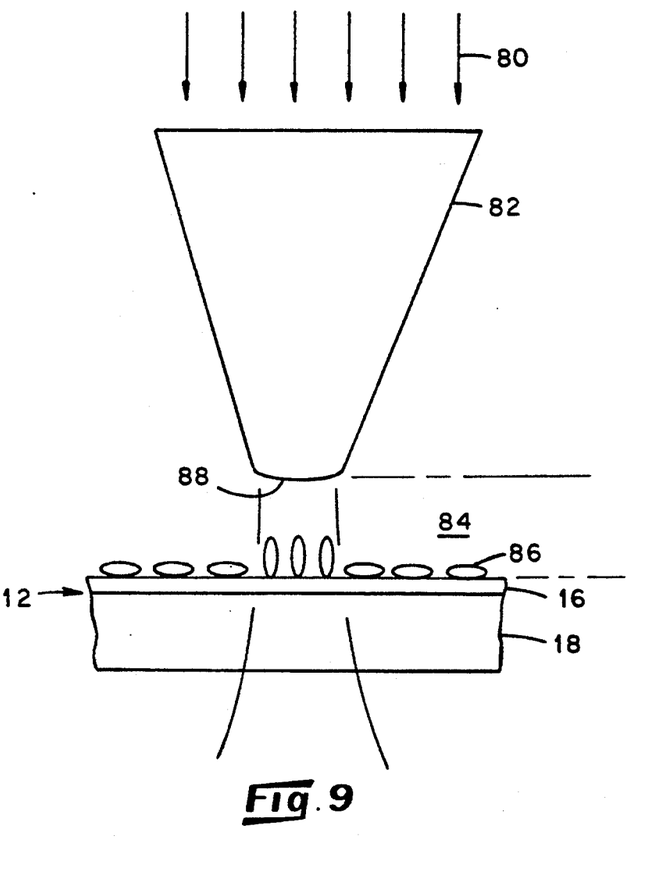
FIG. 9 is a schematic cross sectional view showing a near-field read/write/delete head utilized in conjunction with a storage device.

A near field arrangement shown in FIG. 9, delivers light 80 to an optical layer 86 through a plastic or glass micropipette 82 with a small hole or optical fiber tip having a small distal end 88. The size of the physical beam can be further decreased by producing molecular excitons within crystalline solids formed at the tip of the micropipette 82. This method involves aiding the transmission of light through sub-wavelength dimensions with the introduction of crystals that store light energy as excitons, effectively reducing the volume of the light beam by $10^9$ and making possible propagation through dimensions of one nanometer. Such a light delivery scheme was described by K. Lieberman, S. Haruche, A. Lewis, and R. Kopelman in Science, 247, 59, 1990. In addition to the delivery scheme described in the Lieberman article, other organic or inorganic crystals are known that can provide narrow-line exciton emission that can be used as a read/write means. This light delivery scheme is utilized in SERODS as a write/read beam to achieve data storage capacity at or approaching the single-molecule level.

The near field tip 88 is used to deliver laser light for the write and/or read operations and to generate an electromagnetic near field region within one wavelength of the surface of a storage device 12; the tip 88 is also used as a microhead for detecting the SERS signal in the read process. For example, the near field light delivery system is used in the write process to produce subwavelength molecular state changes in the molecules of an optical layer 86. An appropriate storage device would be any of the previously described embodiments of storage devices in which desired microenvironment changes can be made by an optical write/delete beam. In the read process, the near field tip 88 is utilized to focus laser light 80 to selectively excite a particular molecule or group of molecules to detect the SERS emission in the read process.

Figure 10:
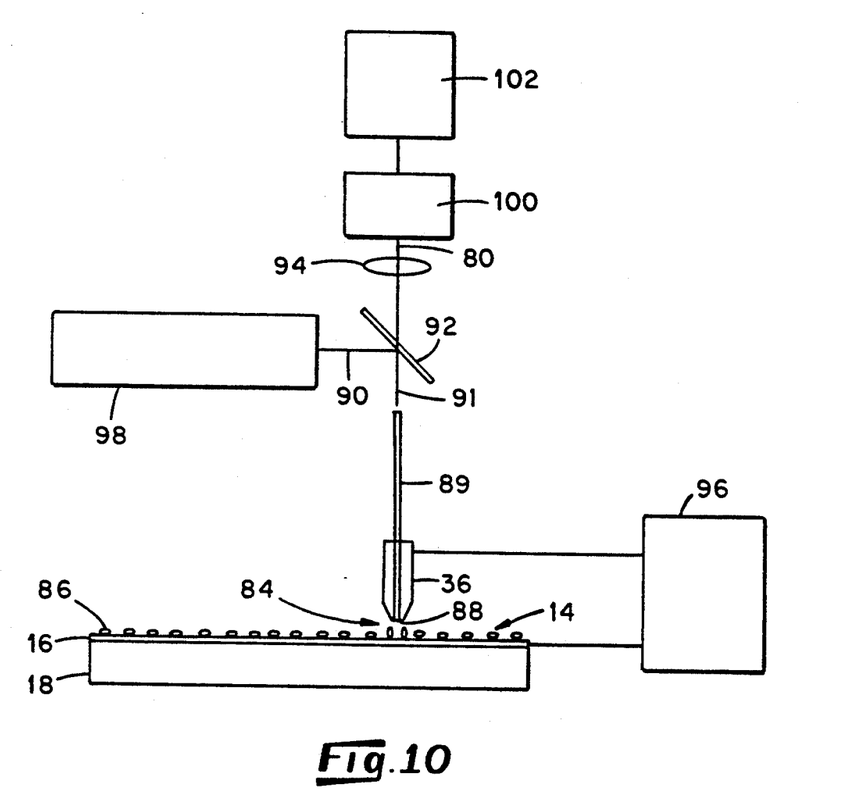
FIG. 10 is a schematic cross sectional view of a complete SERODS system utilizing a near-field read/write/delete head.

Referring now to FIG. 10, the near field approach requires precise control of the distance between the substrate surface 16 and the light delivery tip 88. In particular, the light delivery tip 88 must stay within the near field region 84 in order for the near field technique to work. The feed-back system 96 uses atomic force measurements to provide such control. As the tip 88 is scanned across the optical layer 86 by system 96, the interatomic forces are measured between the tip 88 and the substrate 16 and used in a feedback loop to hold the tip at a desired distance from the optical layer 86, as by using a piezoelectric or other appropriate electromechanical device to control the height of the tip 88 above the surface 86 such that the interatomic force remains constant. The principles of feedback system 96 are discussed in G. Binnig, C. F. Quate, and C. H. Gorber, Physical Review Letters, Vol. 56, 930, 1986.

An example of SERODS system using a light delivery tip controlled by an atomic force feedback is schematically depicted in FIG. 10. When the atomic force feedback tip 88 is operated in a mode that senses the repulsive forces between the tip 88 and the substrate 16, the tip is controlled and scanned by the feedback system 96, which prevents the tip 88 from touching the substrate 16, but scans the tip 88 in the near field region 84 of the substrate 16.

To write data, a laser 98 produces coherent light transmitted along light paths 90 and 91 and optic fiber 89 to the tip 88 which transmits the light onto the optical layer 86 with sufficient intensity to change the state of the molecules in the optical layer the delivery of this light also produces the near-field electromagnetic region 84 of FIG. 9. To read data, light is also transmitted by the laser along optical paths 90 and 91 and optic fiber 89 to tip 88 of sufficient intensity and appropriate frequency to produce SERS emissions. The tip 88 receives the SERS emissions and transmits the light through the optical fiber 89, to a beam splitter 92, through focusing optics 94 and a dispersive optical element 100 to a detector 102 which is sensitive to the frequency of the SERS emissions. The signal may then be analyzed by single or multi-head analyzers or multiplex methods as previously described. In like manner, light produced by the laser 98 is delivered by the tip 88 to the optical layer 86 to delete data. Preferably, the laser produces a different frequency or intensity for each of the read, write and delete operations. For example, where the optical layer 86 is constructed of a chemical such as para-amino benzoic acid on a substrate coated with polystyrene latex microspheres having a diameter of about 400 microns and coated with a layer of silver having a thickness of about 75 microns, an appropriate write frequency is that of a krypton laser of about 647.1 nanometers; this same source may be utilized at a lower power for the read beam and at the same or higher power for the delete beam. Another appropriate read/write/delete light source would be a laser operated in the far ultra-violet region to enhance the sensitivity of the storage device by combining the SERS effect with the enhanced resonance Raman effect.

It is noteworthy that one can also replace the atomic force feedback system with another feedback scanning system based on an electric current or light tunneling by simply replacing the atomic force tip 88 with a quantum tunneling tip. Quantum tunneling of the electrons (photons) is a well-known process used in scanned-tip microscopies and may be used as the feedback system 96 in a near-field read/write system.

For example, in the electron (or photon) tunneling feedback system, the distance between the tip and the surface of the sample is controlled by a voltage applied to a piezoelectric translator that controls the movement of the tip. The voltage is determined by a feedback circuit that measures and controls a small electric (or photon) current caused by electrons (or photons) tunneling across the gap between the tip and the substrate under the influence of a low bias voltage applied to the tip.

Another type of scanned-tip approach involves the ion-conductance scanning technique. P. K. Hansma, B. Drake, O. Marti, S. A. C. Gould, and C. B. Prater, Science, Vol. 243, 641, 1989. The ion-conductance scanning technique involves the scanning of a surface by keeping the electrical conductance through a typical micropipette probe constant by adjusting the vertical height at the probe. The ion-conductance scanning technique is quite suitable for SERODS disks emerged in electrolytes as shown in FIG. 4.

Although preferred embodiments are described above, it is understood that the invention is capable of numerous rearrangements, modifications and substitution of parts without departing from the scope of the invention as defined by the appended claims. For example, a three dimensional SERODS storage device could be used utilized to record a coherent optical wave front in holography. Such use of holographic techniques would serve to achieve extremely high data storage density. Likewise, a large variety of different molecular compounds can be utilized for an optical layer or for a SERS-active substrate or as a support for a SERS-active storage device. Additionally, the sensitivity of a SERS-active storage device could be increased by utilizing other photophysical optical techniques such as the hyper-Ramen effect, coherent anti-Stokes Raman Scattering (CARS), enhanced resonance Raman and other non-linear Raman effects. Finally, a hybrid electric/magnetic and optical SERS-active storage device could be constructed by utilizing thin films which are electrically or magnetically sensitive under an appropriate optical layer. Thus, the write/delete procedures could be conducted utilizing magnetic or electric heads and the read procedure could be conducted using light of an appropriate frequency.

What is claimed is:

1. An apparatus for the storage of data comprising:
   Surface Enhanced Raman Scattering (SERS)—active storage means having a multiple state microenvironment which will emit SERS signal of predetermined characteristics depending on the state of the microenvironment when excited, each of said multiple state independently reversibly selectable on a localized area of said medium and an substantially the entire medium;
   write means for selectively reversible changing the state of said microenvironment in localized area of said medium from a first state to a second state in a manner corresponding to the data to be stored, said localized areas having different SERS emission characteristics in said first state than areas in said second state; and
   delete means for selectively reversing the state change induced in at least one of said localized areas of said microenvironment by said write mean.

2. The apparatus of claim 1 wherein said SERS-active storage means further comprises:
   a surface;
   entities distributed on said surface and orientable in at least a first orientation representing one of said multiple states, the orientation of said entitles affecting SERS emission of said storage means;
   separate localized regions of said entities defined on said surface such that entities in each of said separate localized regions may selectively exist in the first orientation independently of the entities in other of said localized regions.

3. The apparatus of claim 2 wherein said write means further comprises:
   means for imposing a force on the entities of selected ones of said localized regions for causing the entities of the selected localized region to become oriented into the first orientation.

4. The apparatus of claim 2 wherein said first orientation is an adsorption state of said entities.

5. The apparatus of claim 2 wherein said first orientation is a directional state of said entities.

6. The apparatus of claim 2 wherein said first orientation is a molecular state of said entities.

7. The apparatus of claim 1 wherein said storage means is provided as an electrode in an electrolytic cell and said write means is an electric or magnetic head.

8. The apparatus of claim 1 further comprised of a plurality of said storage means distributed in a three-dimensional array for the storage of data in three-dimensions.

9. The apparatus of claim 8 wherein said write means is adapted to utilize holographic techniques to store the data in said three-dimensional array of storage means.

10. The apparatus of claim 1 wherein the write means is a near field microhead comprised of:
    incident electromagnetic radiation field generating means for providing light to be used to selectively disturb the microenvironment of the storage device and to provide a radiation field in the region near the surface of the storage device;
    light propagation means having a distal end of predetermined size to direct the incident radiation toward the surface of the storage device, said distal end being of a size corresponding to the size of the portion of the microenvironment to be disturbed; and
    microhead control means for controlling said light propagation means such that said distal end is maintained within the near field region of the surface of said storage device.

11. The apparatus of claim 10 wherein the microhead control means comprises an atomic force feedback control system.

12. The apparatus of claim 10 wherein the microhead control means comprises a scanning-tunneling feedback control system.

13. The apparatus of claim 10 wherein the microhead control means comprises an ion-conductance feedback control system.

14. The apparatus of claim 1 further comprising read means for reading data written onto a SERS-active storage device comprising:
    excitation means for providing and direct electromagnetic excitation radiation of an appropriate frequency and intensity to induce SERS emissions by said storage means; and
    detector means for receiving and analyzing SERS emissions from said storage device and generating a signal corresponding to the received emission which represents the data stored on the storage device; and
    direction means for directing said excitation radiation to the portion of said storage device to be read and directing SERS emissions from said storage device to said detection means.

15. The apparatus of claim 14 wherein said direction means comprises:
    electromagnetic radiation field generation means for providing excitation radiation to the surface of said storage device to induce SERS emissions and for providing an incident radiation near field adjacent the surface of the storage device;
    light propagation means having a distal end of predetermined size to direct said excitation radiation to the portion of said storage device to be read, said distal end being of a size corresponding to the size of the portion of said storage device containing one bit of data; and microhead control means for controlling said light propagation means such that said distal end is maintained within the near field region adjacent said storage device.

16. The apparatus of claim 14 wherein said write means and said delete means are provided in a single write/delete means.

17. A near-field microhead for reading, writing and deleting data stored on the surface of an optical data storage device comprised of:

incident electromagnetic radiation field generating means for providing light to be used to selectively illuminate the surface of the storage device and to provide a radiation field in a region near the surface of the storage device;

light propagation means having a distal end of predetermined size to direct the incident radiation toward the surface of the storage device, said distal end being of a size corresponding to the size of the portion of the storage device to be illuminated; and microhead control means for controlling said light propagation means such that said distal end is maintained within the near-field region of the surface of said storage device; and electromagnetic radiation intensity control means for controlling the intensity of the radiation propagated to the surface of the storage device by said distal end such that the intensity of said radiation is selected and varied to read, write or delete data on the portion of the storage device illuminated.

18. A near-field microhead of claim 17 wherein the microhead control means comprises an atomic force feedback control system.

19. A near-field microhead of claim 17 wherein the microhead control means comprises a scanning-tunneling feedback control system.

20. A near-field microhead 17 of claim 17 wherein the microhead control means comprises an ion-conductance feedback control system.

* * * * *